United States Patent [19]

Kaneko et al.

[11] Patent Number: 5,017,913
[45] Date of Patent: May 21, 1991

[54] COORDINATES INPUT APPARATUS

[75] Inventors: Kiyoshi Kaneko, Yokohama; Atsushi Tanaka, Kawasaki, both of Japan

[73] Assignee: Canon Kabushiki Kaisha, Tokyo, Japan

[21] Appl. No.: 579,254

[22] Filed: Sep. 5, 1990

Related U.S. Application Data

[63] Continuation of Ser. No. 209,057, Jun. 20, 1988, abandoned.

[30] Foreign Application Priority Data

Jul. 1, 1987 [JP] Japan .............................. 62-162401
Jul. 1, 1987 [JP] Japan .............................. 62-162402

[51] Int. Cl.$^5$ ............................................. G09G 3/02
[52] U.S. Cl. .................................. 340/712; 340/708; 178/18
[58] Field of Search ..................... 340/706, 708, 712; 178/18, 19; 341/20; 364/520; 310/311, 313 R

[56] References Cited

U.S. PATENT DOCUMENTS

| | | | |
|---|---|---|---|
| 4,055,726 | 10/1979 | Turner et al. | 178/18 |
| 4,568,799 | 2/1986 | Kobayashi et al. | 178/18 |
| 4,654,648 | 3/1987 | Herrington et al. | 178/18 |
| 4,665,282 | 5/1987 | Sato et al. | 178/18 |
| 4,717,793 | 1/1988 | Kobayashi | 178/18 |
| 4,772,764 | 9/1988 | Dorr | 178/18 |
| 4,791,416 | 12/1988 | Adler | 178/18 |
| 4,931,965 | 6/1990 | Kaneko et al. | 178/18 |

Primary Examiner—Jeffery A. Brier
Assistant Examiner—M Fatahiyar
Attorney, Agent, or Firm—Fitzpatrick, Cella, Harper & Scinto

[57] ABSTRACT

There is provided a coordinates input apparatus to decide input coordinates from the propagating times of the ultrasonic vibrations on a vibration propagating plate made of a transparent glass plate input tablet. This apparatus comprises: a vibration pen to generate a vibration; and input tablet to which the vibration pen touches and which propagates the vibration generated; vibration sensors, attached to the input tablet, for detecting the vibration generted by the vibration pen and propagated by the input tablet; a measuring device to respectively measure two periods of time from the vibration input by the contact with the input tablet by a vibration pen until the leading and trailing zero-cross timings of the peak wave among the vibration waves are detected by the vibration sensors; a calculating circuit for calculating the vibration propagating distances from the vibration input point on the input tablet to the vibration sensors on the basis of the two periods of time until the leading and trailing edges of the peak wave among a vibration waves measured by the measuring device and the vibrating velocity; and a controller to obtain the position coordinate values of the vibration input point on the input tablet by the vibration propagating distances from the vibration input point to the vibration sensors.

8 Claims, 7 Drawing Sheets

COORDINATES INPUT APPARATUS

This application is a continuation of application Ser. No. 07/209,057 filed June 20, 1988 now abandoned.

BACKGROUND OF THE INVENTION

1. Field of the Invention

The present invention relates to a coordinates input apparatus and, more particularly, to a coordinates input apparatus for determining the input coordinates from the propagating times of the ultrasonic vibrations on a vibration propagating plate.

2. Related Background Art

Hitherto, a coordinates input apparatus for inputting coordinates by using an ultrasonic vibration has been known. For example, a plurality of vibration sensors are attached to predetermined positions such as corner positions of an input tablet made of glass, metal, or other vibration propagating material, a vibration is input to the tablet by an input pen having a vibrator at the tip portion, and the vibration propagating time to each vibration sensor is measured, thereby measuring the distance between the vibration input point and each vibration sensor on the basis of the vibration propagating speed on the tablet and determining the coordinates of the input point on the basis of the distance information. As the vibration sensors, the mechanical/electrical converting elements such as piezoelectric transducers or the like are used. As the vibrator, the electrical/mechanical converting element is used.

In the measurement of the vibration propagating time according to the foregoing system, timer means is started synchronously with the vibrator of the input pen, the output waveform of the vibration sensor is measured, and the timer means is stopped when the vibration sensor detects the vibration.

Hitherto, as a method of determining the vibration detecting timing, there is known a method whereby the peak timing of the envelope of the output waveform of the sensor is detected or a method whereby it is detected that the output waveform of the sensor has exceeded a fixed threshold value.

However, according to the conventional system, particularly, in the structure of the coordinates input apparatus in which the vibration propagating material of the tablet is vibrated by the plate wave, in the case of the system in which the peak of the envelope is detected, an error of $\pm \frac{1}{2}$ wavelength of the vibration used occurs due to the differences in group velocity and phase velocity due to the dispersion.

On the other hand, the amplitude of the detection waveform which is output from the vibration sensor largely changes also depending on the propagating distance on the vibration propagating plate and the writing pressure when the input pen is operated. Therefore, according to the system in which the threshold value of the fixed level is used, the detection error of a few wavelengths occurs.

Consequently, any of the conventional systems has a problem such that the vibration propagating time and distance cannot be measured at high accuracies.

To solve this problem, there has also been considered a system in which, on the basis of the rule of the changes depending on the distances of the group velocity and phase velocity, both the detecting timing of the envelope peak (corresponding to the group velocity) and the zero-cross timing of the peak waveform (corresponding to the phase velocity) are measured, and are combined by a predetermined method, thereby determining the vibration propagating distance. However, this system has problems since two systems using the different detectors are necessary with respect to one vibration sensor and, in particular, a complicated analog processing system is required for the envelope extracting system, so that it is difficult to construct a simple cheap system.

SUMMARY OF THE INVENTION

It is an object of the present invention to provide a coordinates input apparatus in which the vibration propagating distance is measured on the basis of the zero-cross timing of the peak wave instead of the level information of the detection waveform which depends on the writing pressure and vibration propagating distance. The coordinates of the input point are further determined, and the coordinates can be accurately input irrespective of the writing pressure and vibration propagating distance.

DETAILED DESCRIPTION OF THE PREFERRED EMBODIMENTS

Figure 1:
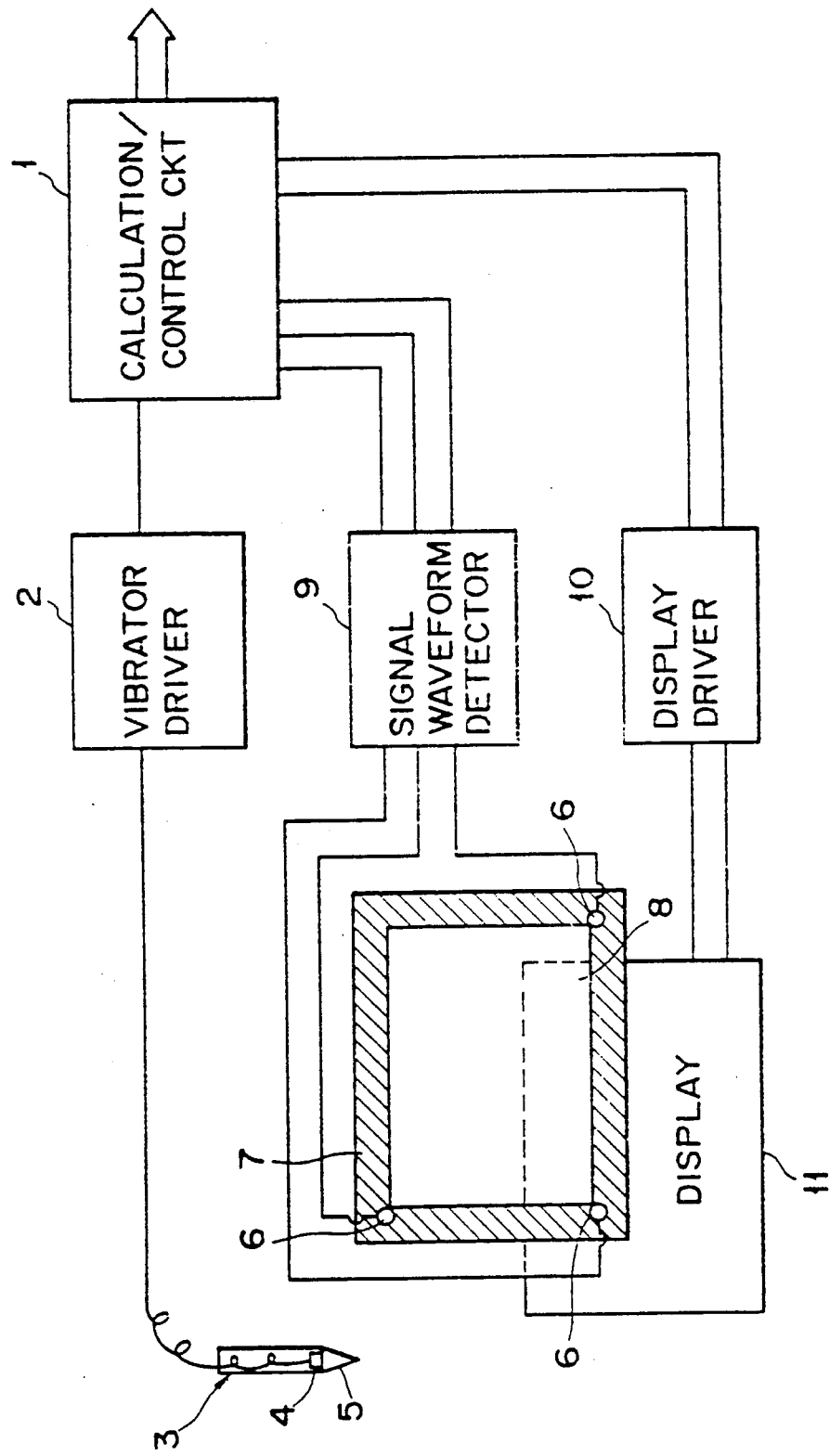
FIG. 1 is an explanatory diagram showing an arrangement of a coordinates input apparatus to which the invention is applied.

The present invention will be described in detail hereinbelow on the basis of an embodiment shown in the drawings.

FIG. 1 shows an arrangement of a coordinates input apparatus to which the invention is applied. In the coordinates input apparatus of FIG. 1, coordinates are input by a vibration pen 3 to an input tablet consisting of a vibration propagating plate 8, thereby displaying an input image to a display 11' consisting of a CRT arranged overlappingly on the input tablet in accordance with the input coordinate information.

In FIG. 1, the vibration propagating plate 8 is made of an acrylic plate, glass plate, or the like and propagates the vibration which is propagated from the vibration pen 3 to three vibration sensors 6 attached to the corner portions of the plate 8. In this embodiment, the coordinates of the vibration pen 3 on the plate are detected by measuring the propagating times of the ultrasonic vibrations propagated to the sensors 6 from the vibration pen 3 through the plate 8.

The peripheral portion of the vibration propagating plate 8 is supported by a reflection preventing material 7 such as silicone rubber or the like in order to prevent the vibration propagated from the vibration pen 3 from being reflected by the peripheral portion and returned toward the central portion.

The vibration propagating plate 8 is arranged on the display 11' such as a CRT (or liquid crystal display or the like) which can display an image by dots. The plate 8 displays an image by dots at the positions traced by the vibration pen 3. That is, the dots are displayed at the position on the display 11' corresponding to the detected coordinates of pen 3. The image consisting of elements such as point, line, or the like which was input by the vibration pen 3 appears after the track of the vibration pen as if it was written on a paper.

On the other hand, according to such a constitution, it is also possible to use an input system such that a menu is displayed on the display 11' and a desired item in this menu is selected by using the vibration pen, or an input system such that a prompt is displayed and the vibration pen 3 is touched to a predetermined position, or the like.

The vibration pen 3 to propagate the ultrasonic vibration to the vibration propagating plate 8 has therein a vibrator 4 consisting of a piezoelectric element or the like. The ultrasonic vibration generated by the vibrator 4 is propagated to the plate 8 through a horn portion 5 having a pointed tip.

Figure 2:
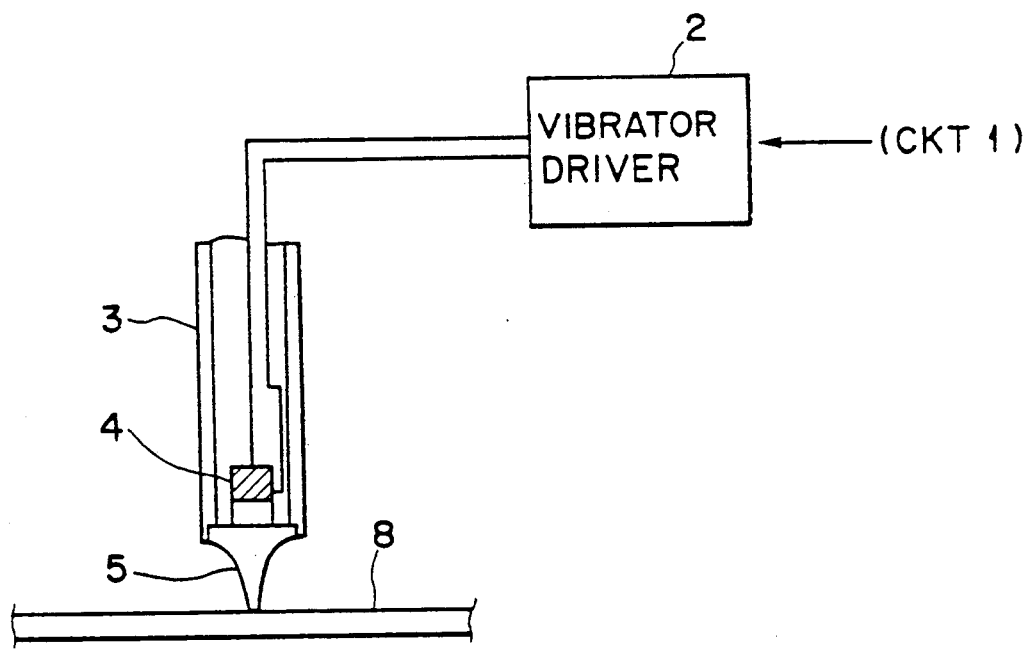
FIG. 2 is an explanatory diagram showing a structure of a vibration pen in FIG. 1.

FIG. 2 shows a structure of the vibration pen 3. The vibrator 4 attached in the pen 3 is driven by a vibrator driver 2. A drive signal of the vibrator 4 is supplied as a low-level pulse signal from a calculation/ control circuit 1 in FIG. 1 and amplified at a predetermined gain by the vibrator driver 2 which can drive at a low impedance. Thereafter, the amplified drive signal is applied to the vibrator 4.

The electrical drive signal is converted into the mechanical ultrasonic vibration by the vibrator 4 and propagated to the vibration propagating plate 8 through the horn portion 5.

The oscillating frequency of the vibrator 4 is set to such a value that a plate wave can be generated in the vibration propagating plate 8 made of acryl, glass, or the like. On the other hand, when the vibrator is driven, a vibrating mode wherein the vibrator 4 vibrates mainly in the vertical direction in FIG. 2 for the plate 8 is selected. Further, by setting the oscillating frequency of the vibrator 4 to the resonant frequency of the vibrator 4, the vibration can be efficiently converted.

The elastic wave which is propagated to the plate 8 as mentioned above is the plate wave and has an advantage such that it is hardly influenced by scratches on the surface of the plate 8, an obstacle, or the like as compared with the surface wave or the like.

Returning to FIG. 1, the vibration sensors 6 attached to the corner portions of the vibration propagating plate 8 also consist of mechanical/electrical converting elements such as piezoelectric elements or the like. Each output signal of the three vibration sensors 6 is input to a signal waveform detector 9 and converted into an detection signal which can be processed by the calculation/control circuit 1 provided at the post stage. The calculation/control circuit 1 measures the vibration propagating times and detects the coordinate position of the vibration pen 3 on the vibration propagating plate 8.

The coordinate information of the vibration pen detected is processed by the calculation/control circuit 1 in accordance with the output method by the display 11'. That is, the calculation/control circuit 1 controls the output operation of the display 11' through a display driver 10 on the basis of the input coordinate information.

Figure 3:
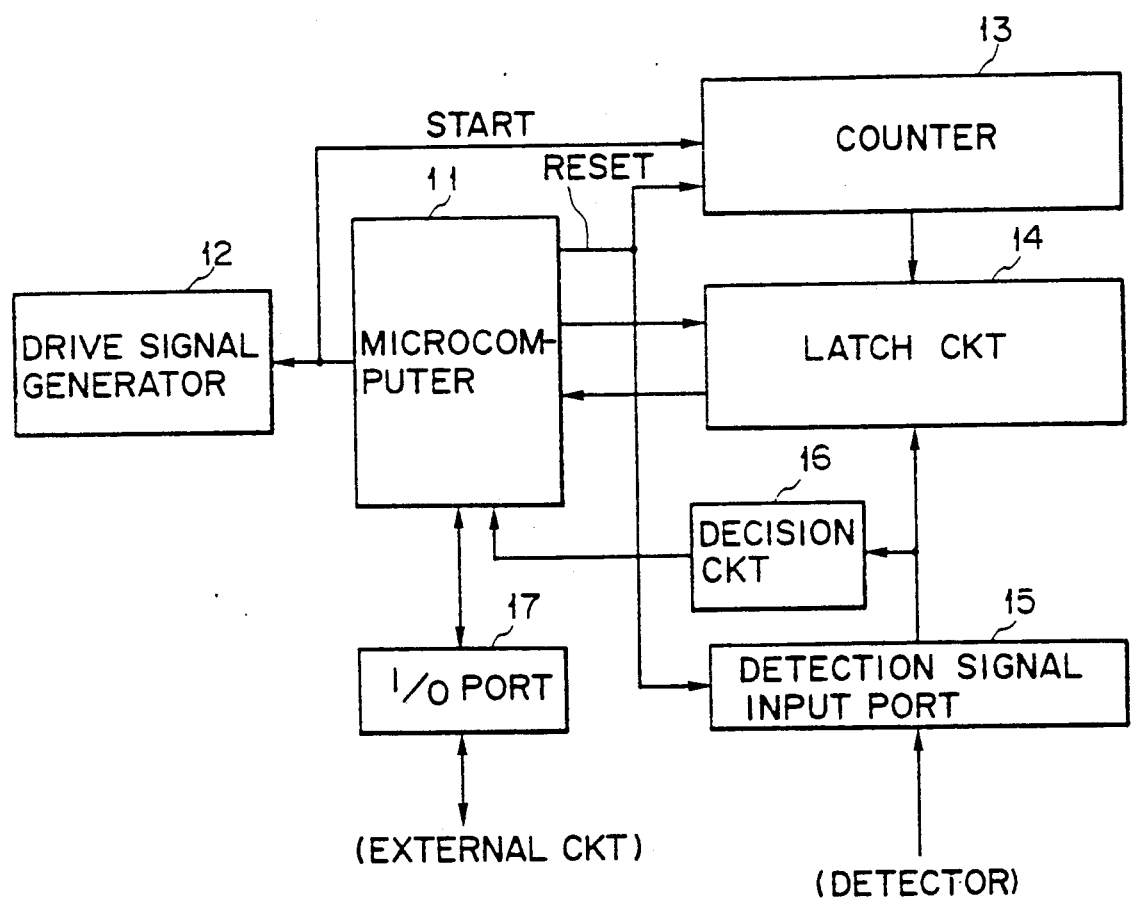
FIG. 3 is a block diagram showing a constitution of a calculation/control circuit in FIG. 1.

FIG. 3 shows an arrangement of the calculation/control circuit 1 in FIG. 1.

A microcomputer 11 has therein an internal counter, a ROM, and a RAM. A drive signal generator 12 outputs drive pulses of a predetermined frequency to the vibrator driver 2 in FIG. 1 and is made operative by the microcomputer 11 synchronously with the circuit to calculate the coordinates.

A count value of a counter 13 is latched into a latch circuit 14 by the microcomputer 11.

On the other hand, the signal waveform detector 9 outputs timing information of the detection signal to measure the vibration propagating time for detection of the coordinates from the outputs of the vibration sensors 6 as will be explained hereinafter. This timing information is input to an input port 15.

The timing signal which is input from the waveform detector 9 is input to the input port 15 and stored into the memory areas corresponding to the respective sensors 6. The result of the comparison is input to the microcomputer 11.

That is, the vibration propagating time is represented as a latch value of the output data of the counter 13. The coordinates are calculated by the value of the vibration propagating time. At this time, a decision circuit 16 checks whether all of the timing information for waveform detection from the plurality of vibration sensors 6 have been input or not and sends the result to the microcomputer 11.

The output control process of the display 11' is performed through an input/output port 17.

Figure 4:
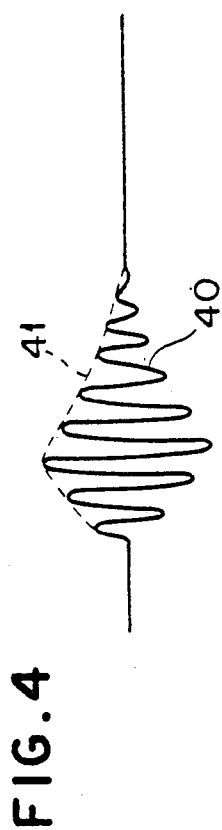
FIG. 4 is a waveform diagram showing an output waveform of a vibration sensor.

In the above constitution, the vibration waveform which is input from the vibration pen 3 and propagated to the three vibration sensors 6 is modulated during the propagation by the different group delay characteristics and phase delay characteristics of the plate waves even if the vibrator 4 of the vibration pen 3 is driven by the square wave, so that when the vibration waveform arrives at the sensors 6, it becomes a waveform as shown in FIG. 4. A signal 40 serving as a carrier is propagated at the phase velocity and an envelope signal 41 is propagated at the group velocity as shown in FIG. 4 due to the influence by the dispersion. For the signals which are propagated at the phase and group velocities, the detection waveforms having different phases depending on the vibration propagating distances are output.

Therefore, in the conventional system wherein a fixed threshold value is used or the envelope peak is merely measured, the accurate vibration propagating time cannot be determined. On the other hand, in the method whereby both the group velocity and phase velocity are measured and combined, the circuit arrangement becomes fairly complicated and expensive.

Figure 5:
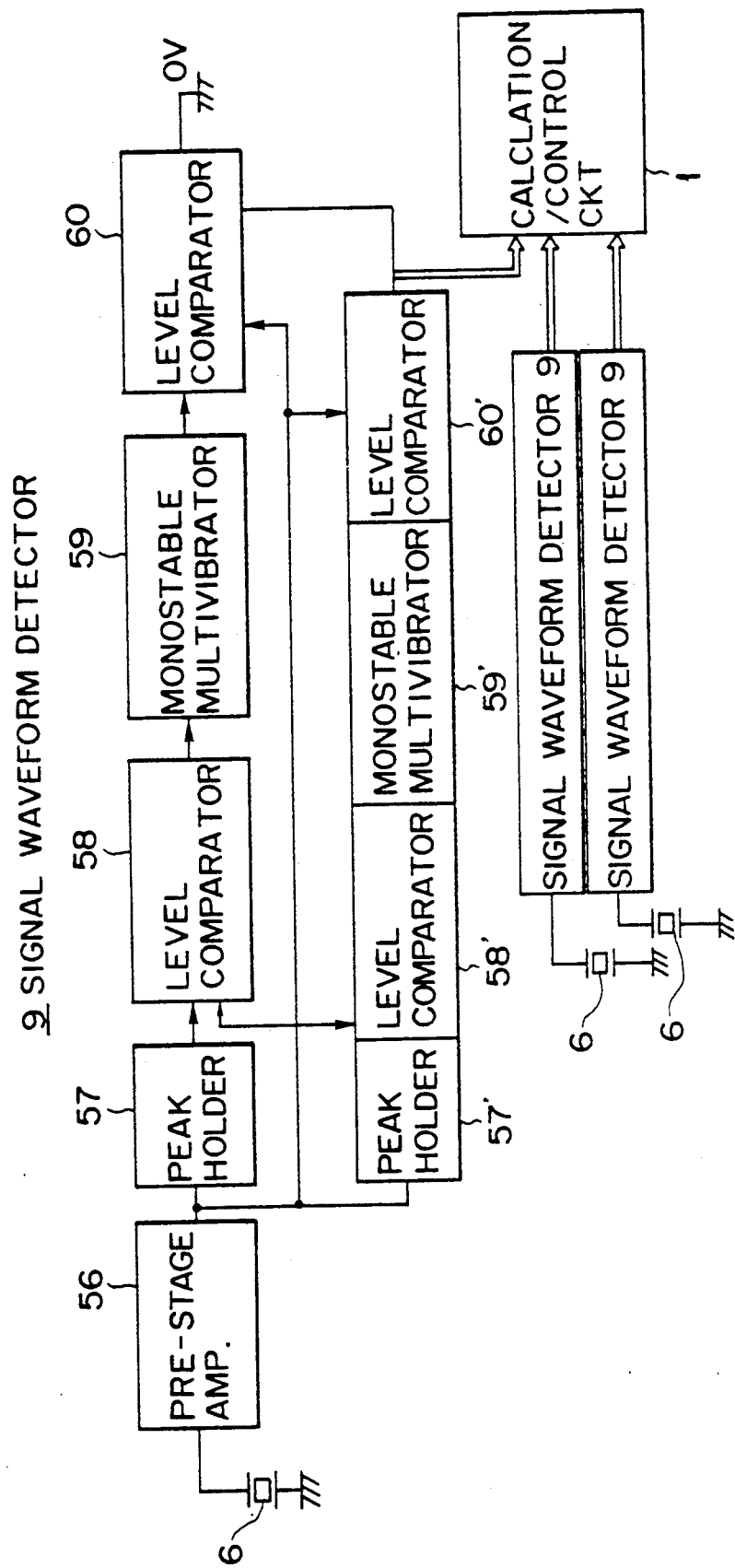
FIG. 5 is a block diagram showing an arrangement of a signal waveform detector in FIG. 1.

Therefore, in this embodiment, the signal waveform detector 9 in FIG. 1 is constituted as shown in FIG. 5.

In FIG. 5, reference numerals 56 to 60 and 57' to 60' are circuits to process the output of one of the vibration sensors 6. The output of the other vibration sensors 6 are also processed by similar circuits.

First, the output of the sensor 6 is input to a pre-stage amplifier 56 and amplified by a predetermined gain and input to peak holders 57 and 57'. The peak holders 57 and 57' sequentially store the peak values of the polarities of + and −, respectively.

An output of the peak holder 57 is input to a level comparator 58 consisting of an operational amplifier or the like and compared with an output waveform of the pre-stage amplifier 56. The output circuit of the level comparator 58 includes a voltage level converter and the like. Only when the output signal of the amplifier 56 is larger than the output signal of the peak holder 57, the level comparator 58 outputs a high level signal. A monostable multivibrator 59 at the post stage consists of digital elements such as TTL elements.

The output of the level comparator 58 is input to the monostable multivibrator 59. The monostable multivibrator 59 outputs a pulse having a predetermined time width by using an output pulse of the level comparator 58 as a trigger.

A level comparator 60 similar to the level comparator 58 is connected to an output of the monostable multivibrator 59. The level comparator 60 compares the output of the pre-stage amplifier 56 with the 0 level. Only when the output of the amplifier 56 is higher than the 0 level, a high level logic signal is output. The level comparator 60 is activated so as to execute the comparing operation only when the multivibrator 59 outputs the high level signal.

A peak holder 57′, a level comparator 58′, a monostable multivibrator 59′, and a level comparator 60′ are constituted in a manner similar to the peak holder 57, level comparator 58, monostable multivibrator 59, and level comparator 60. However, the level information in the negative direction is processed in the circuits 57′ to 60′. Namely, the peak holder 57′ holds the peak of the negative potential. The level comparators 58′ and 60′ output high level signals when the output of the pre-stage amplifier 56 is lower than a reference potential (the absolute value is larger), respectively.

FIGS. 6A to 6E show signal processes in the constitution of FIG. 5.

Figure 6:
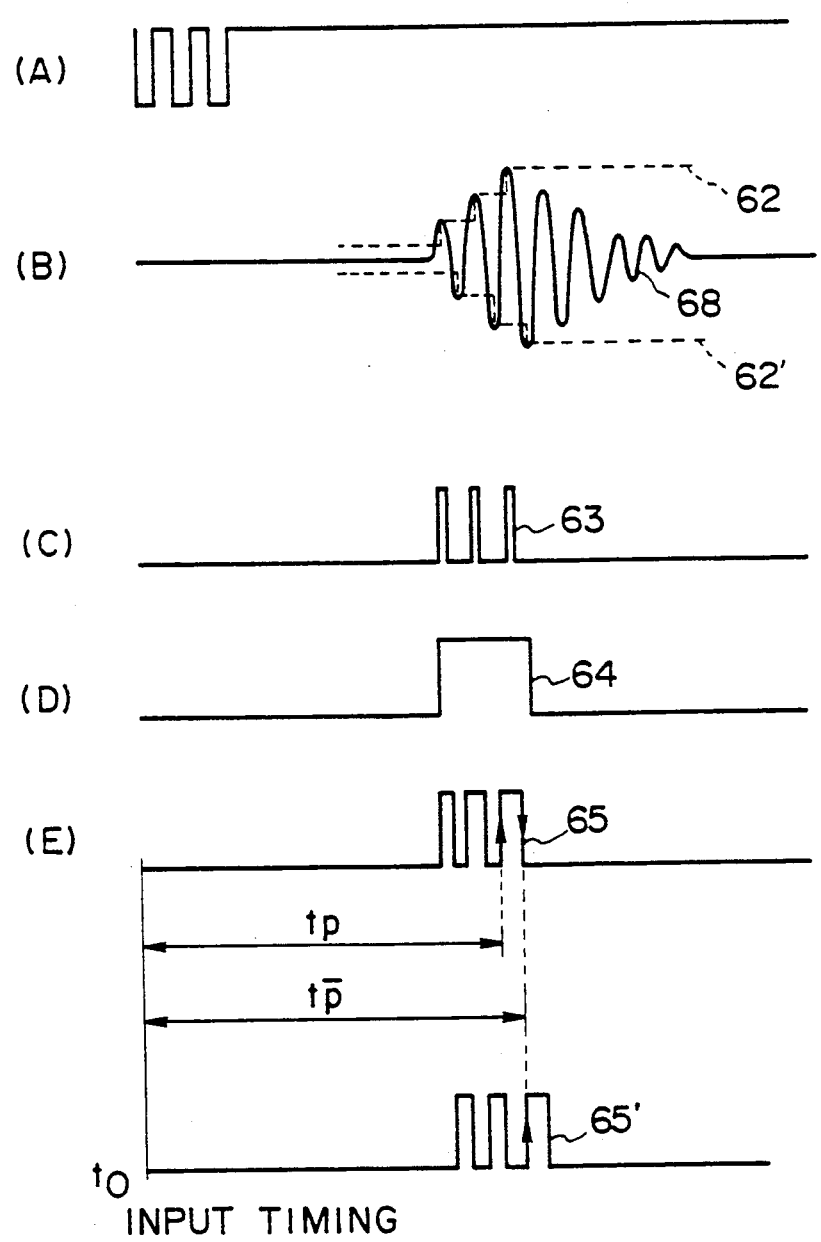
FIGS. 6A to 6E are waveform diagrams showing the operation of the detector in FIG. 5.

FIG. 6A shows a drive signal waveform which is input to the vibrator 4 of the vibration pen 3. FIG. 6B shows a detection output waveform (in this case, the output waveform of the pre-stage amplifier 56) of the vibration sensor 6. The envelope of the detection waveform changes depending on the group delay and phase delay characteristics as shown in the diagram.

Since the output of the amplifier 56 is input to the peak holders 57 and 57′, peak values 62 and 62′ which are held in the peak holders 57 and 57′ change as shown by broken lines.

The level comparators 58 and 58′ compare the peak values 62 and 62′ with the output waveform of the amplifier 56. However, since the peak values 62 and 62′ fluctuate later than the change in the output waveform of the amplifier 56, the high level signals are output from the comparators 58 and 58′ only when the amplitude level of the output of the amplifier 56 is increasing.

In FIG. 6C, reference numeral 63 denotes an output pulse of the level comparator 58. When the attenuation of the output waveform of the amplifier 56 is started, the output waveform of the amplifier 56 does not exceed the peak level held in the peak holder 57, so that the pulse of FIG. 6C is obtained only when the envelope is increasing.

The monostable multivibrators 59 and 59′ output pulses of predetermined time widths by use of the output pulses of the level comparators 58 and 58′ as triggers. In FIG. 6D, reference numeral 64 denotes an output of the monostable multivibrator 59.

Only when the outputs of the multivibrators 59 and 59′ are held at the high level, the level comparators 60 and 60′ compare the 0 level with the output signal of the amplifier 56. When the absolute value of the output signal of the amplifier 56 is larger than 0, the high level signals are output from the level comparators 60 and 60′.

Thus, the outputs of the comparators 60 and 60′ are obtained as pulses such as shown at 65 and 65′ in FIG. 6E.

As is obvious from the above description, the leading edges of the last pulses of the pulses 65 and 65′ in FIG. 6E correspond to the leading and trailing edge timings of one waveform of the peak of the output waveform of the amplifier 56, respectively.

In this embodiment, the leading timings of the last pulses of the pulses 65 and 65′ in FIG. 6E are sent to the calculation/control circuit 1. Time values $t_p$ and $t_p'$ are latched into the latch circuit 14 at these timings. Therefore, two memory areas for $t_p$ and $t_p'$ are set in the latch circuit 14 at every sensing.

As a method of taking the time information of the counter into the latch circuit 14 by the last pulses in FIG. 6E, for example, there is considered a method whereby the latch circuit 14 is reset by the output pulse of the level comparator 58 shown in FIG. 6C. According to this method, the last time information remaining in the latch circuit 14 can be set to the time value $t_p$ or $t_p'$.

In the foregoing constitution, by detecting the zero-cross point of the peak of the vibration detection waveform, the waveform detecting timing can be determined irrespective of the height of the amplitude of the peak wave. Thus, the vibration propagating time can be accurately measured irrespective of the writing pressure of the vibration pen 3 and the vibration propagating distance, that is, the input position on the vibration propagating plate 8.

A method of determining the vibration propagating distance using the time values $t_p$ and $t_p'$ obtained as mentioned above will now be explained with reference to FIGS. 7 and 8.

Figure 7:
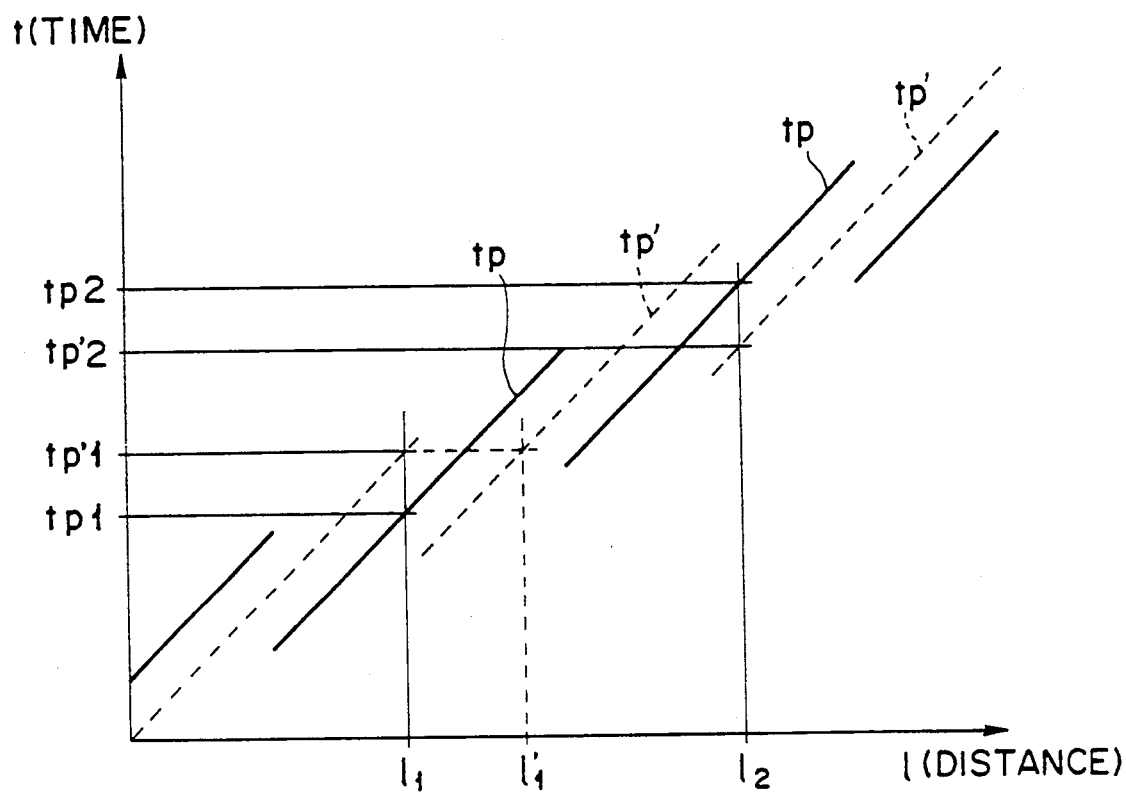
FIGS. 7 and 8 are diagrams showing processes of time information which is obtained from the signal waveform detector in FIG. 5, respectively.

FIG. 7 shows the relations among the input point by the vibration pen 3, distance l of the sensor 6, and vibration propagating time. The time values $t_p$ and $t_p'$ detected as mentioned above correspond to the phase velocities and discontinuously change in accordance with the distance as shown in the diagram.

For example, as shown in FIG. 7, detection times $t_{p1}$ and $t_{p'1}$ can be measured for a certain distance between the vibration pen 3 and the vibration sensor 6. However, if the leading and trailing edges of the waveform are ignored, the time $t_{p'1}$ is also detected even in the case of a distance $l_1'$.

However, according to FIG. 7, when the time $t_{p1}$ until the leading edge of the peak wave is shorter than a time $t_{p'1}$ until the trailing edge, the distance can be decided to be $l_1$.

To determine the distance by such a method, there is considered a method whereby two time values $t_p$ and $t_p'$ are used as input values and the distance information is used as an output value, and the diagram of FIG. 7 is stored as a table into the memory.

On the other hand, the times $t_p$ and $t_p'$ represent the leading and trailing zero-cross times of the peak and the timing of the envelope peak exists therebetween. These time values $t_p$ and $t_p'$ also include the propagating velocity of the vibration envelope, i.e., the information of the group velocity.

Therefore, the information of the group delay time $t_g$ is detected from the time values $t_p$ and $t_p'$ and by use of this time information, the distance can be linearly and highly accurately detected. A calculating method for this distance detection in the calculation/ control circuit 1 will now be described hereinbelow.

That is, it is assumed that the shorter one of the two detection times $t_p$ and $t_p'$ is processed as the group delay time. For example, in the case of the distance $l_1$, the shorter time value $t_{p1}$ is set to the group delay time $t_g$. In the case of the distance $l_2$, the shorter time value $t_{p'2}$ is set to the group delay time $t_g$. The longer delay time value $t_{p'1}$ or $t_{p2}$ is set to the phase delay time $t_p$. Then, the arithmetic operation is executed.

For example, a vibration propagating distance d can be obtained by $$d = V_g \cdot T_g \qquad (1)$$

from the group velocity $V_g$ and group delay time $T_g$ which are peculiar to the vibration propagating plate 8. In this equation, when the shorter one of $t_p$ and $t_p'$ is used in place of $V_g$, the error of $\frac{1}{2}$ wavelength, i.e., $\pm\frac{1}{4}$ wavelength occurs for the delay time $T_g$ by the true group velocity.

On the other hand, the distance d can be obtained by the phase velocity $V_p$ as follows.

$$d = n \cdot \lambda_p + V_p \cdot t_p \qquad (2)$$

where, $\lambda_p$ denotes a wavelength of the elastic wave and n is an integer.

The integer n is shown as follows from the above equations (1) and (2).

$$n = [(V_g \cdot t_g - V_p \cdot t_p)\lambda_p + 1/N] \qquad (3)$$

where, N is a real number other than 0 and a proper numerical value is used. For example, when N=2 and the wavelength is within $\pm\frac{1}{2}$, n can be decided.

By substituting the value of n obtained as mentioned above for the equation (2), the distance between the pen 3 and the sensor 6 can be accurately measured.

As mentioned above, by obtaining the zero-cross times $t_p$ and $t_p'$ of the leading and trailing edges of the peak of the vibration detection waveform and by processing the shorter one of these time values as the group delay time, the distance between the input point and the sensor can be accurately determined on the basis of the rules of the group delay and phase delay characteristics as shown in FIGS. 2 and 3 without performing the envelope extracting process which needs the complicated analog processing circuit.

Figure 8:
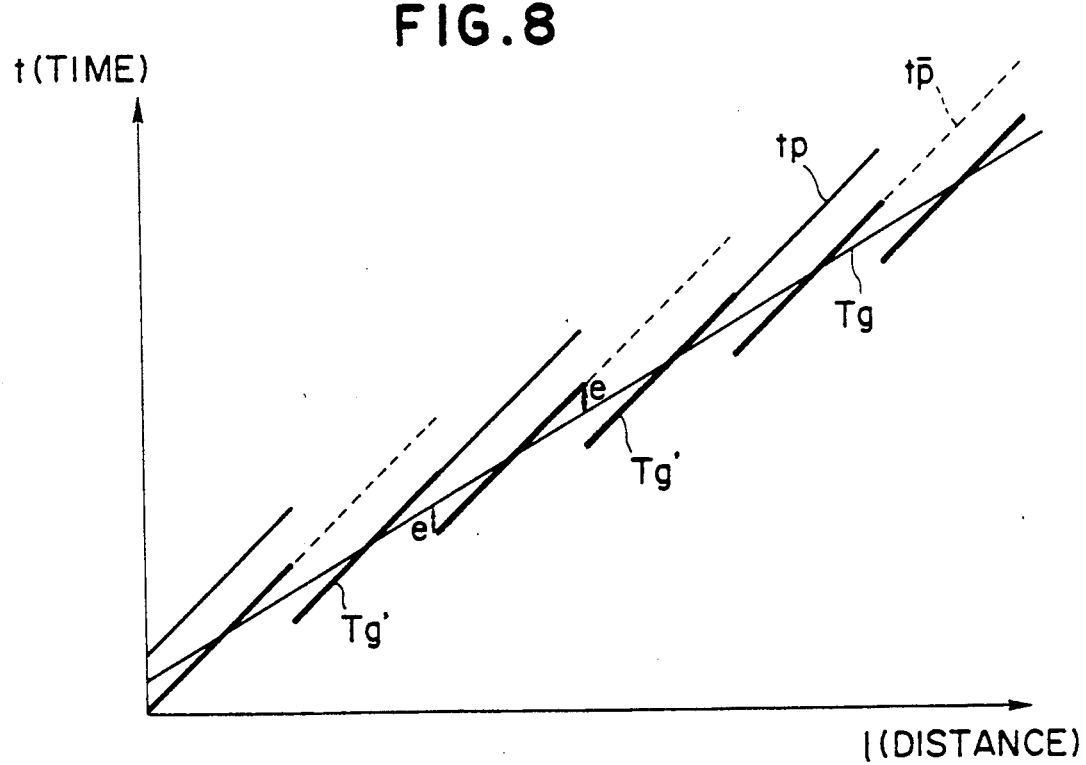

FIG. 8 shows a diagram in the case of using the shorter one of the time values $t_p$ and $t_p'$ as the group delay velocity. As mentioned above, since the shorter one of the time values $t_p$ and $t_p'$ is used as the group delay time $T_g$, discontinuous line segments $T_g'$ shown as bold lines respectively denote a change in the group delay time $T_g$ in this embodiment. The true group delay time passes through the center of the line segment as shown by a straight line $T_g$. A difference e between each line segment $T_g'$ and the straight line $T_g$ is fairly matched at the maximum $\pm\frac{1}{4}$ wavelength. It will be understood that the distance can be considerably accurately measured by the foregoing calculating method.

Although the arithmetic operation has been shown as the equations in the above embodiment, it is also considered a method whereby relations as shown in FIG. 8 are stored as a table into the memory and used.

To obtain the orthogonal coordinate values from the distance between the input point of the pen 3 and each sensor 6, the following calculations are performed.

Figure 9:
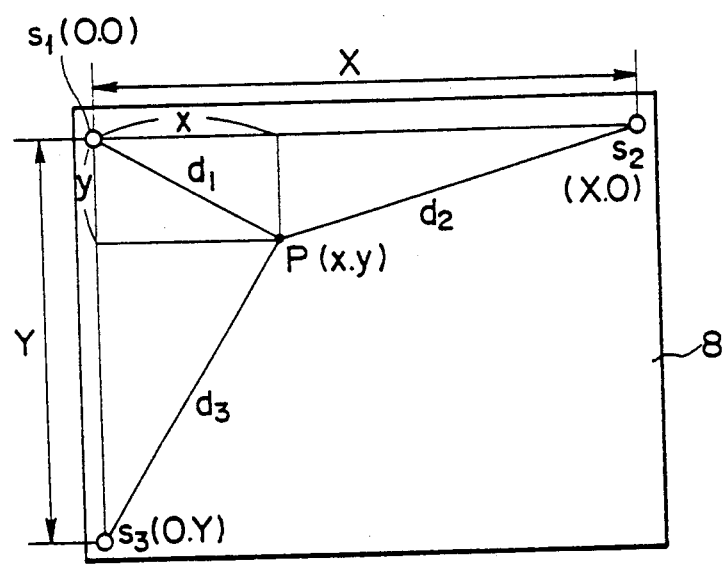
FIG. 9 is an explanatory diagram showing an arrangement of vibration sensors.

For example, in the case of arranging the three vibration sensors 6 to the corner portions of the vibration propagating plate 8 as shown in FIG. 9 at positions $S_1$ to $S_3$, the coordinates (x, y) of the position P of the pen 3 can be calculated from the straight line distances $d_1$ to $d_3$ from the position P of the pen 3 to the positions of the sensors 6 by the following equations on the basis of the theorem of three squares.

$$x = X/2 + (d_1 + d_2)(d_1 - d_2)/2X \qquad (4)$$

$$y = Y/2 + (d_1 + d_3)(d_1 - d_3)/2Y \qquad (5)$$

where, X and Y represent distances along the X and Y axes between the sensors 6 at the positions $S_2$ and $S_3$ and the origin (position $S_1$).

In the constitution of FIG. 5, the peak holding process and level comparing process have been performed by the analog circuit. However, it is also considered a method whereby the output of the pre-stage amplifier 56 is digitized by an A/D converter and the leading and trailing zero-cross times $t_p$ and $t_p'$ of one peak wave are detected by the digital arithmetic operations.

On the other hand, although the example of the constitution in which the peak holders are used to obtain the peak level of the detection waveform has been shown, other systems can be also considered.

For example, the output signal of the pre-stage amplifier 56 is compared with fixed plus and minus threshold values near the 0 level to obtain the pulses as shown in FIG. 6C, the time pulse as shown in FIG. 6D is formed by the monostable multivibrator by using the first pulse, while an envelope is extracted, the peak timing is detected from the differential signal of the envelope signal to thereby detect the zero-cross point, and the time values $t_p$ and $t_p'$ are obtained in this manner.

On the other hand, although the constitution the shorter one of the time values $t_p$ and $t_p'$ is processed as the group delay time, the longer time value can also be used as the group delay time. In addition, the mean value of the time values $t_p$ and $t_p'$ can also be used as the group delay time.

As will be obvious from the above description, according to the invention, the vibration propagating distance is measured on the basis of the zero-cross timing of the peak wave instead of the level information of the detection waveform which depends on the writing pressure or vibration propagating distance, and the coordinates of the input point are further determined. Therefore, the coordinates can be accurately input irrespective of the writing pressure and vibration propagating distance. A complicated analog processing system for envelope extraction or the like is unnecessary. Therefore, there are excellent advantages such that the constitution of the apparatus can be simplified and its cost can be reduced.

We claim:

1. A coordinates input apparatus comprising:
   vibration generating means for generating a vibration:
   a vibration propagating member to which said vibration generating means touches and which propagates the vibration generated;

a plurality of detecting means, attached to said vibration propagating member, for detecting the vibration generated by said vibration generating means;

measuring means for respectively measuring two periods of time from the vibration input due to the contact with said vibration propagating member by said vibration generating means until the leading and trailing zero-cross timings of a peak wave among a plurality of vibration waves during the vibration detected by said plurality of detecting means;

calculating means for calculating vibration propagating distances from the vibration input point on said vibration propagating member to said plurality of detecting means on the basis of said two periods of time until the leading and trailing edges of the peak wave among the vibration waves measured by said measuring means and a vibrating velocity; and control means for obtaining coordinate values of the position of the vibration input point on said vibration propagating member on the basis of the vibration propagating distances from the vibration input point calculated by said calculating means to said plurality of detecting means.

2. An apparatus according to claim 1, wherein said calculating means has holding means to which said two periods of time measured by said measuring means are assigned as a phase delay time and a group delay time of the vibration waves which are propagated on the vibration propagating member and which previously holds the relations among the phase delay time, the group delay time, and the vibration propagating distance, and the vibration propagating distance is calculated by said two periods of time by reference to the content held in said holding means.

3. An apparatus according to claim 1, further having display means for displaying the position on the vibration propagating member corresponding to the position coordinate values obtained by said control means.

4. An apparatus according to claim 3, wherein said vibration propagating member is made of a transparent glass plate and is located on said display means.

5. A coordinates input apparatus comprising:

vibration generating means for generating a vibration;

vibration propagating member to which said vibration generating means touches and which propagates the vibration generated;

a plurality of vibration detecting means, attached to said vibration propagating member, for detecting the vibration generated by said vibration generating means;

zero-cross timing detecting means for detecting leading and trailing zero-cross timings of a peak wave among a plurality of vibration waves during the vibration detected by said plurality of vibration detecting means;

means for activating said zero-cross timing detecting means only for the period of time corresponding to the period of time when the amplitude of the vibration wave detected by said vibration detecting means increases;

measuring means for measuring two periods of time from the vibration input due to the contact with said vibration propagating member by said vibration generating means until the leading and trailing zero-cross timings of the peak wave among the vibration waves which are detected for the period of time when said zero-cross timing detecting means is activated by said activating means;

calculating means for calculating vibration propagating distances from the vibration input point on said vibration propagating member to said plurality of vibration detecting means on the basis of said two periods of time measured by said measuring means and a vibrating velocity; and control means for obtaining the position coordinates values of the vibration input point on said vibration propagating member on the basis of the vibration propagating distances from the vibration input point calculated by said calculating means to said plurality of vibration detecting means.

6. An apparatus according to claim 5, wherein said calculating means has holding means to which said two periods of time measured by the measuring means are assigned as a phase delay time and a group delay time of the vibration waves which are propagated on the vibration propagating member and which previously holds the relations among the phase delay time, the group delay time, and the vibration propagating distance, and the vibration propagating distance is calculated on the basis of said two periods of time by reference to the content held in said holding means.

7. An apparatus according to claim 5, further having display means for displaying the position on the vibration propagating member corresponding to the position coordinate values obtained by said control means.

8. An apparatus according to claim 7, wherein said vibration propagating member is made of a transparent glass plate and is located on said display means.

* * * * *

UNITED STATES PATENT AND TRADEMARK OFFICE
CERTIFICATE OF CORRECTION

PATENT NO. : 5,017,913
DATED : May 21, 1991
INVENTOR(S) : KIYOSHI KANEKO ET AL.          Page 1 of 3

It is certified that error appears in the above-identified patent and that said Letters Patent is hereby corrected as shown below:

AT [56] REFERENCES CITED

Insert, --Foreign Patent Documents
　　0258972　3/1988　European Pat. Off.
　　0204184　12/1986　European Pat. Off.
　　0169563　1/1986　European Pat. Off.--.

AT [57] ABSTRACT

Line 6, "and" should read --an--.
Line 9, "generted" should read --generated--.
Line 12, "a" should read --the--.
Line 14, "the peak" should read --a peak--.
Line 20, "a" should read --the--.
Line 21, "the vibrating" should read --a vibrating--.

SHEET 4 OF 7

FIG. 5, "CALCLATION" should read --CALCULATION--.

COLUMN 2

Line 61, "plate" should read --plate 8--.

COLUMN 3

Line 9, "pen 3." should read --the pen 3.--.
Line 28, "calculation/ control" should read --calculation/control--.
Line 56, "an" should read --a--.
Line 62, "vibration pen" should read --vibration pen 3--.

UNITED STATES PATENT AND TRADEMARK OFFICE
CERTIFICATE OF CORRECTION

PATENT NO. : 5,017,913
DATED : May 21, 1991
INVENTOR(S) : KIYOSHI KANEKO ET AL.

Page 2 of 3

It is certified that error appears in the above-identified patent and that said Letters Patent is hereby corrected as shown below:

COLUMN 6

Line 56, "$t_P$" should read --$t_p$--.

COLUMN 7

Line 2, "calculation/ control" should read --calculation/control--.

Line 33, "$n=[(V_g \cdot t_g - V_p \cdot t_p)\lambda_p + 1/N]$ (3)" should read --$n=[(V_g \cdot t_g - V_p \cdot t_p)/\lambda_p + 1/N]$ (3)--.

Line 54, "velocity. As" should read --velocity. ¶ As--.

COLUMN 8

Line 41, "constitution the" should read --constitution wherein the--.

COLUMN 9

Line 47, "vibration propagating member" should read --a vibration propagating member--.

UNITED STATES PATENT AND TRADEMARK OFFICE
CERTIFICATE OF CORRECTION

PATENT NO. : 5,017,913
DATED : May 21, 1991
INVENTOR(S) : KIYOSHI KANEKO ET AL.

It is certified that error appears in the above-identified patent and that said Letters Patent is hereby corrected as shown below:

<u>COLUMN 10</u>

Line 47, "coordinate" should read --coordinates--.

Signed and Sealed this

Tenth Day of August, 1993

Attest:

MICHAEL K. KIRK

*Attesting Officer*     Acting Commissioner of Patents and Trademarks